United States Patent
Sussingham et al.

[15] 3,665,178
[45] May 23, 1972

[54] RESERVE TYPE FLASHLIGHT

[72] Inventors: George J. Sussingham, Yonkers; Franklin G. Fagan, Jr., Ossining, both of N.Y.

[73] Assignee: P. R. Mallory & Co., Inc., Indianapolis, Ind.

[22] Filed: July 9, 1970

[21] Appl. No.: 53,522

[52] U.S. Cl. ........................................ 240/10.6, 136/114
[51] Int. Cl. ................................................ F21l 15/00
[58] Field of Search ............... 240/10.6, 10.65; 136/90, 95, 136/114, 90.1

[56] References Cited

UNITED STATES PATENTS 1,988,139 1/1935 Pellini ................................. 136/95
2,063,070 12/1936 Winckler ............................. 136/90
2,312,463 3/1943 Zdansky ........................... 240/10.6
2,896,067 7/1959 Lockwood ....................... 240/10.6
3,065,337 11/1962 Torgerson ....................... 240/10.65
3,484,297 12/1969 Zaleski .............................. 136/114

Primary Examiner—Louis J. Capozi
Attorney—Robert Levine

[57] ABSTRACT

A reserve flashlight utilizing a reserve cell, normally inactive by keeping the electrolyte isolated, until desired for use, and then rendered active by releasing the electrolyte to function between the electrodes. The housing is a plastic molded structure, inexpensive enough to be discarded when the cell is used up.

9 Claims, 3 Drawing Figures

Patented May 23, 1972
3,665,178
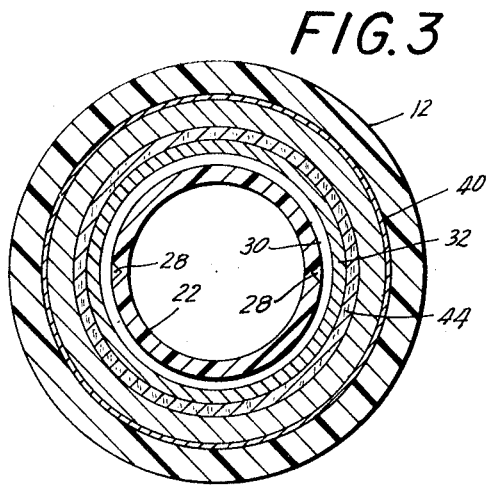
FIG.3
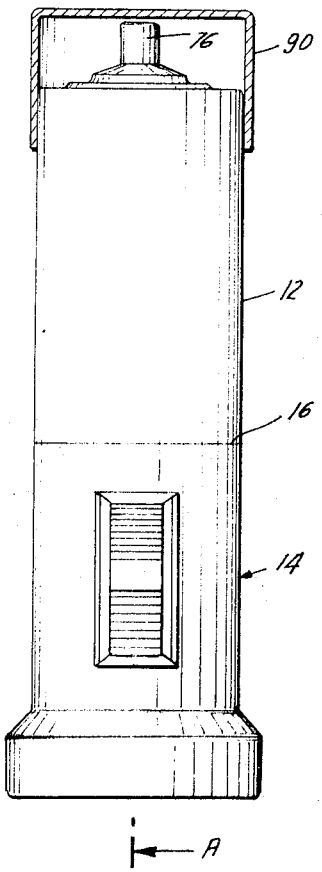
FIG.1
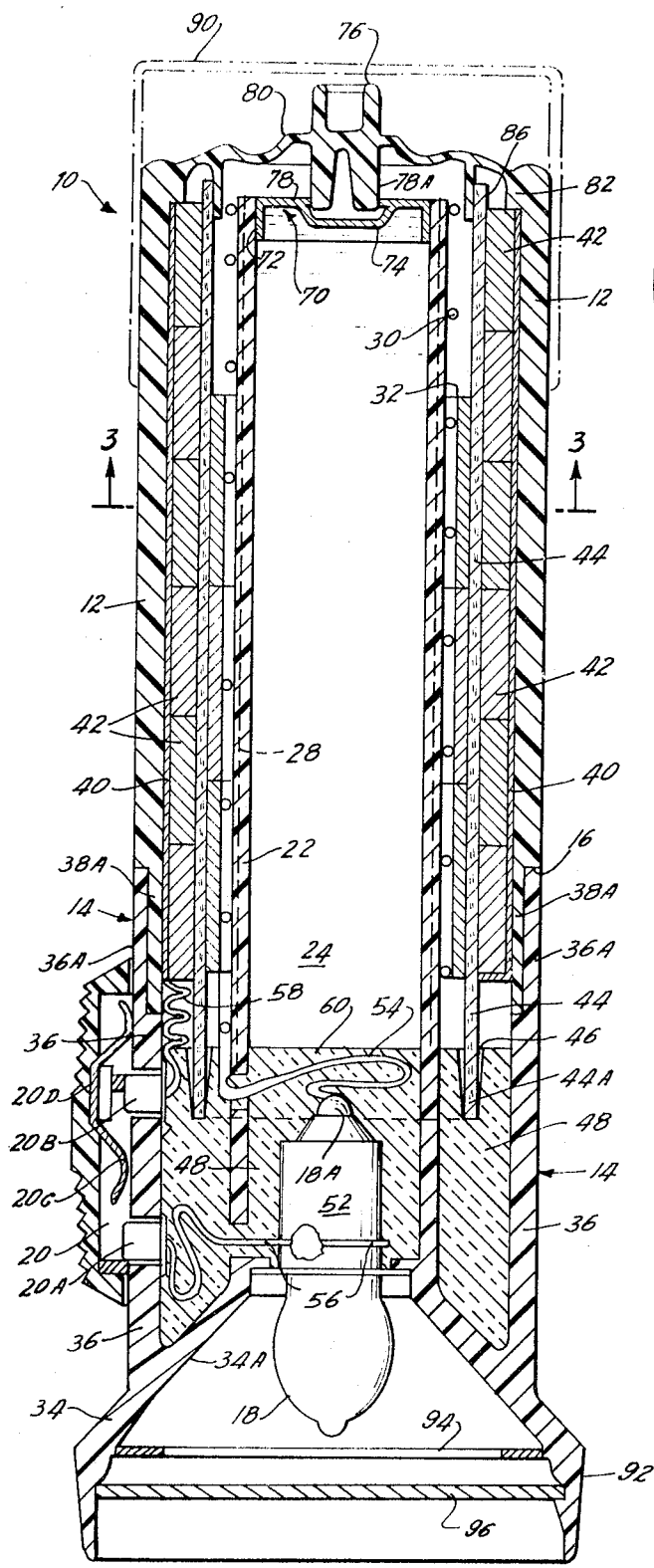
FIG.2
INVENTORS
BY
ATTORNEY

RESERVE TYPE FLASHLIGHT This invention relates to a reserve type flashlight employing a reserve type cell which is inactive and ineffective until the flashlight is to be put into use, at which time the reserve type cell is then rendered active to energize the flashlight. The housing for the flashlight is made as a plastic molded structure, inexpensive enough to be discarded when the cell is used up.

In conventional cases where a flashlight is provided with conventional batteries that are immediately and currently active, the flashlight may not be needed, and therefore not called on for use in service, during substantial periods of time. In the meantime, however, the electric battery cells are in an active state, and internal chemical action causes deterioration of the battery to such an extent as to render the battery ineffective and useless when the flashlight is wanted and needed, even though the battery cells have apparently not been used for some time for the function of lighting the lamp in the flashlight.

The object of this invention is to provide a reserve flashlight in which the battery cell is normally inactive, so there is no chemical activity or deterioration within the battery cell while the flashlight is stored, either on the shelf, in inventory, or in the appropriate storage space of the user.

A further object of the invention is to provide such a reserve type flashlight, which shall be extremely economical; which shall have excellent shelf life before activation; which shall provide reliable electrical internal connections; which shall provide long service life after activation; and which shall be sufficiently economical to be disposable as a discardable throw-away unit after the energy in the reserve cell has been fully utilized.

In order to provide the flashlight of this invention as an economical throw-away unit, the features of construction and design are made such as to promote the economy of construction that will make this device relatively inexpensive.

The construction and design features of a reserve flashlight, made in accordance with the principles of this invention, are described in the following specification, taken together with the drawings, in which FIG. 1 is a vertical elevational view of a flashlight made in accordance with this invention with a rear cover cap shown in section;

FIG. 2 is a longitudinal sectional view of the flashlight of FIG. 1; and

FIG. 3 is a transverse sectional view of the flashlight of FIG. 2, taken along the line 3—3 in FIG. 2.

As shown in the drawings, a flashlight 10 made in accordance with the principles of this invention is formed as a single functional unit consisting of two plastic molded sections 12 and 14, made to fit together longitudinally, as two co-axially interfitting sleeves, to meet at a junction 16, which is then suitably hermetically sealed.

The forward section 14 contains a lamp 18, a switch assembly 20, and a hollow plastic cylinder 22 to provide a space or reservoir 24, for an electrolyte 26. The hollow cylinder 22 is provided with longitudinal flutes 28 on its periphery, to permit later free flow of the electrolyte 26 along the length of the cylinder 22, when the cylinder 22, normally closed to retain the electrolyte, is later opened to permit the electrolyte to flow out of the reservoir in the cylinder to render the cell active. A helically coiled wire 30 surrounds the reservoir cylinder 22 to provide a conductor for connecting a cylindrical anode 32 of the cell to one terminal contact of the lamp 18, here shown as the rear terminal 18A. The reservoir cylinder 22 is a backwardly extending plastic portion of the forward section 14, whose front end is shaped in part to constitute a body for a parabolic lamp reflector 34, which is integrally molded in said forward section 14 and subsequently silver surfaced after molding to provide a silver surface 34A. The parabolic lamp reflector body 24 is also molded to embody an outer cylindrical body 36 which extends backward to provide an annular portion to serve as an outer sleeve 36A to fit co-axially over a corresponding annular inner sleeve 38A which is a lower extension of the rear molded cylinder body 12.

The operating elements of the battery cell consist of a metallic cathode cylindrical tube 40 against which are slidingly fitted annular pressed powder rings of depolarizing material 42, which are inserted to snugly engage the inner surface of the cathode metal tube 40.

Disposed against the inner surface of the co-axially arranged depolarizing material rings 42, is a longitudinal cylinder 44 of an absorbent insulating material to serve as a spacer between the depolarizer rings 42 and the anode cylinder 32, previously referred to. The anode cylinder 32 may similarly be constructed of short annular rings or cylinders to fit internally against the inner surface of the absorbent spacer 44. The circuit connection from the anode cylinder 44 down to the back terminal 18A of the lamp is established through the helically wound wire element 30, which serves as a conductor to engage all elements or parts of the anode 32 and the springiness in its characteristics is utilized to hold the helically wound conductor wire in position to engage the inner surface of the anode sections 32, while at the same time remaining held in position on the plastic cylinder 22 that constitutes and serves as the reservoir for the electrolyte 26.

The absorbent spacer 44 is supported on its bottom and is held in an appropriate position, in an annular well 46 in a potting compound 48 that is appropriately disposed between the lower end of the inner plastic reservoir cylinder 22 and the inner wall at the lower end of the plastic cylinder 36 of the forward body portion 14. During the curing and hardening of the potting compound 48, a suitable ring is temporarily disposed to depend into the upper level of the potting compound to control the formation of the well 46 as an annular slot for receiving the lower end 44A of the absorbing spacer 44.

The potting compound 48 serves also to enclose and protect the socket 52 for the lamp; and serves to enclose the back conductor 54 extending from the helical wire as a connection to the rear terminal of the lamp socket 52. The potting compound also serves to enclose a second conductor 56 from the second terminal of the lamp socket 52 that extends to one stationary terminal 20A of the switch 20. The other stationary terminal 20B of switch 20 is also appropriately supported in the outer plastic cylinder 36, in a position where it is connected to the cathode cylinder 40 by a flexible conducting lead 58, the lower end of which is also immersed in and protected by the potting compound 48 within the confining space between the inner plastic reservoir cylinder 22 and the outer plastic cylinder 36.

The two stationary contacts 20A and 20B of switch 20 are arranged to be bridged by a reciprocatable bridge contact 20C, which is a movable part of the switch and is supported on a thumb piece 20D, shown with appropriate serrations on its outer surface to permit functional, frictional operation by a thumb of the operator.

After the curing and hardening of the potting compound to provide an internal closure plug 60 at the bottom, internally, of the reservoir cylinder 22, the electrolyte for the cell is inserted into the reservoir space of the inner plastic cylinder 22, to substantially fill that cylinder. An internal closure cap 70 of a plastic similar to that of cylinder 22, both being inert to the electrolyte, is then suitably sealed to the inner surface of the cylinder 22 around the top internal border edge at a region 72. The closure cap 70 is constructed to embody a frangible central floor portion 74 which may be readily fractured by a depressible fracturing button 76 provided with two prongs 78 and 78A for cutting into and fracturing the central floor portion of the closure cap 70.

In order that the fracturing button 76 may be readily thumb-operated, that button 76 is centrally and co-axially supported on a circularly fluted plastic disc 80 as an end cover which is constructed to fit snugly within and to extend to the internal peripheral surface 82 at the upper end of the back outer cylinder 12, and when so inserted, a suitable hermetic seal is established along the surface 82. The fluted end cover 80 is also provided with a co-axial annular apron 84 of appropriate dimension to receive the upper end 86 of the absorbing spacer 44 to provide mechanical and insulating support for that upper end 86 of the spacer 44, and to serve to seal off any of the electrolyte from bypassing that upper end of the absorbent spacer 86 into a region occupied by the depolarizing material 42.

In order to prevent casual or undesired external contact with the fracturing button 76, that would fracture the closure cap 70 and release the electrolyte to render the cell active when such operation is not desired, a protective cover cap 90 is provided to fit over the upper or rear end of the rear outer body cylinder 12.

Normally, the cell is inactive, since the electrolyte 26 is confined within the inner cylinder 22 and is not permitted to enter the space between the anode elements 32 and the cathode depolarizer elements 42.

When operation of the flashlight is desired, the rear closure cap 70 is ruptured by the rupturing button 76 being forcibly pressed axially inward. As a result the closure cap floor 74 of the reservoir cap 70 is ruptured, thereby permitting the electrolyte 26 to flow out of the reservoir 24 into the outer space between the reservoir cylinder 22 and the outer cylinder 36.

When the reservoir cap 70 is thus fractured and the electrolyte released, the longitudinal flutes or slots 28, previously referred to, shown more clearly in FIG. 3, on the outer surface of reservoir cylinder 22, become effective to permit the electrolyte to flow freely and quickly along the space outside of the inner cylinder 22 to quickly move into the space occupied by the absorbing spacer 44 to wet that spacer and render it effective as the ionic conductor of the cell. The electrolyte thus leaking out of its reservoir is absorbed and taken up by the absorbing spacer 44 and is thus positioned and held in place to serve as the ionic conductor between the anode elements 32 and the cathode and depolarizer elements 42.

The cell is thus activated and is ready to provide energy to the lamp upon the operation of the thumb switch 20 to electrically connect the two contact terminals 20A and 20B.

The front end of the flashlight is provided with the usual conventional elements, including a forwardly extending plastic cylinder 92 held in properly radially spaced position by a washer 94, and serving to support a plate of glass or other transparent material 96, which may be of clear material or colored material, as may be desired.

Thus, in accordance with the disclosure herein, a designed construction of an inexpensive flashlight has been provided, by means of which a reserve cell structure may be included and built into the flashlight so that the flashlight can be stored indefinitely to be inactive, and yet be readily available for immediate use, when desired, by a simple operation of fracturing the sealed electrolyte reservoir to release the electrolyte and to establish the cell in operating active condition. At the same time the construction is made sufficiently economical and inexpensive to enable the flashlight to be a discardable unit when the energy of the cell has been fully used.

Various modifications might be made in the cell design and in the arrangement of the elements thereof, within the spirit and scope of the invention, without departing from the spirit and scope of the claims.

What is claimed is:

1. A portable hand operable reserve flashlight comprising
a molded plastic case having a front portion to embody and constitute and serve as a lamp and reflector section, and supporting a control switch thereon, and shaped to include an axial concentric hollow cylinder to define a reservoir space for a body of electrolyte;
and a rear section to fit in a human hand and to fit onto said front portion and to provide space for and to include
a cathode structure,
a depolarizer,
an anode, and
an absorbent separator barrier between said depolarizer and anode;
means for normally keeping said reservoir space closed and sealed to retain a volume of electrolyte therein isolated from said cathode and anode elements, in order thereby to keep said battery cell elements inactive;
and means for rupturing said closing and sealing means of said reservoir to release said electrolyte from said reservoir and to permit said electrolyte to move into space between said anode and said cathode and to wet and soak said absorbent separator barrier and said depolarizer, to establish an ionic conductor between cathode and anode and to thereby render the cell active to provide energy for the flashlight upon closure of the control switch;
and said axial concentric hollow cylinder having a longitudinally fluted outer peripheral surface formed thereon to enable the freed electrolyte to flow quickly into its operating space to quickly engage the anode and through said separator to the cathode, to enable the flashlight to become quickly operative for use when desired.

2. A reserve flashlight, as in claim 1, in which
said front portion includes an internal hollow cylindrical container supported on said front portion and having an internal space to accommodate a pre-determined volume of electrolyte.

3. A reserve flashlight, as in claim 1, in which
said front cylindrical plastic portion embodies an outer housing cylindrical about an axis, and an inner concentric cylinder to define a reservoir for said electrolyte within said inner cylinder, and spaced from the outer housing to define a well between said inner and outer cylinders;
a lamp;
means supporting said lamp at the front or lower end of said inner cylinder;
first potting means disposed within said front or lower end of said inner cylinder to envelop and seal the back end of said lamp and to seal the space at the bottom of said inner cylinder as a floor for the electrolyte and to support the lamp;
and second potting means disposed in the well between the inner and the outer cylinders to provide a supporting floor for said absorbent barrier.

4. A reserve flashlight, as in claim 3, in which
said second potting means to support said absorbent barrier is formed with a concentric annular well to serve as a circular seat to receive and position the lower end of said absorbent barrier.

5. A reserve flashlight, as in claim 1, in which
said front portion and said rear portion of said case or housing are respectively provided with interfitting telescoping sections hermetically sealed, and the back end of the rear portion of said case is closed, to confine said electrolyte within said case.

6. A reserve flashlight, as in claim 1, in which
said cathode is disposed against the inner surface of said rear portion of said case;
said depolarizer is disposed to engage the inner surface of said cathode;
said absorbent barrier is disposed to engage the inner surface of said depolarizer;
said anode is disposed within said absorbent barrier;
said reservoir space for said electrolyte is defined within a cylinder concentrically disposed within said anode;
a helically wound conductor frictionally encircles said cylinder for said electrolyte and engages the inner surface of said anode and extends downward to electrically engage one terminal of a lamp supported on the front portion of said case;
a flexible conductor connecting said cathode to one terminal of said switch;
a flexible conductor connecting a second terminal of said lamp to a second terminal of said switch;
and a movable element of said switch for controlling the electrical connection and disconnection of said two terminals of said switch.

7. A reserve flashlight, as in claim 6, in which a closure cap seal is closingly sealed to the top end of the reservoir cylinder and is provided with fracturable element to permit said seal to be broken to release said electrolyte from said reservoir;

an outer closure is fixed to the top or outer end of said case to close said case against any leakage of said electrolyte;

and means are supported on said outer closure for breaking said fracturable element on said closure cap seal to release said electrolyte confined therein.

8. A reserve flashlight, as in claim 7, in which
said reservoir cylinder is provided with longitudinal flutes spaced around the external periphery of said cylinder to enable said electrolyte when released from said cylinder to flow quickly down the full length of the anode and to quickly wet the absorbent barrier and depolarizer to render the cell active.

9. A reserve flashlight, as in claim 1, in which
said cathode electrode is frictionally held in position against the inner surface of said plastic case, and serves, in turn, to support said depolarizer material in place.

* * * * *